US009369381B2

(12) United States Patent
Redi et al.

(10) Patent No.: US 9,369,381 B2
(45) Date of Patent: Jun. 14, 2016

(54) DISRUPTED ADAPTIVE ROUTING (71) Applicant: Raytheon BBN Technologies Corp., Cambridge, MA (US)

(72) Inventors: Jason Keith Redi, Belmont, MA (US); Bakul Grover Khanna, Lexington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 93 days.

(21) Appl. No.: 14/278,786

(22) Filed: May 15, 2014

(65) Prior Publication Data

US 2014/0341227 A1 Nov. 20, 2014

Related U.S. Application Data (60) Provisional application No. 61/824,595, filed on May 17, 2013.

(51) Int. Cl.
*H04W 40/18* (2009.01)
*H04L 12/721* (2013.01)
*H04W 40/02* (2009.01)

(52) U.S. Cl.
CPC ............. *H04L 45/70* (2013.01); *H04W 40/023* (2013.01); *H04L 45/32* (2013.01)

(58) Field of Classification Search
None
See application file for complete search history.

(56) References Cited

U.S. PATENT DOCUMENTS

| 6,816,494 | B1 * | 11/2004 | Raza .................. 370/395.41 |
| 7,184,413 | B2 * | 2/2007 | Beyer et al. ............. 370/254 |
| 7,822,869 | B2 * | 10/2010 | Zuckerman et al. ....... 709/231 |
| 2008/0247408 | A1 * | 10/2008 | Yoon et al. ............. 370/408 |
| 2009/0017825 | A1 * | 1/2009 | Guillouard et al. ........ 455/440 |
| 2009/0129316 | A1 | 5/2009 | Ramanathan et al. |
| 2010/0118727 | A1 * | 5/2010 | Draves et al. ............ 370/252 |

OTHER PUBLICATIONS

A. Vahdat, D. Becker, "Epidemic routing for partially-connected ad hoc networks", Tech. Rep. CS-2000-06, Duke University, Jul. 2000.
E. Jones, P. Ward, "Routing Strategies for Delay-Tolerant Networks", Journal of Computer Communication Journal, 2008. available at ccng.uwaterloo.ca/-pasward/publications.shtml (unpublished), May 2007.

(Continued)

*Primary Examiner* — Chi H Pham
*Assistant Examiner* — Shick Hom
(74) *Attorney, Agent, or Firm* — Lando & Anasasi, LLP (57) ABSTRACT

According to one aspect, embodiments of the invention provide a node comprising a processor, a memory including a predefined mapping, the predefined mapping correlating network characteristics to related critical thresholds at which a delivery ratio of the node is close to a maximum level and at which a total number of transmissions by the node is close to a minimum number necessary to achieve the delivery ratio, and a component configured to communicate with one-hop neighbors of the node and configured to determine at least one characteristic of a dynamic network based on information received from the one-hop neighbors of the node, wherein, in reference to the predefined mapping, the processor is configured to identify a critical threshold associated with the at least one characteristic of the network and is configured to transmit a first packet to at least one one-hop neighbor based on the critical threshold.

26 Claims, 7 Drawing Sheets (56) References Cited

OTHER PUBLICATIONS

A. Lindgren, A. Doria, O . Schel'en, "Probabilistic routing in intermittently connected networks", Lecture Notes in Computer Science, vol. 3126, pp. 239-254, Jan. 2004.

K. Fall, "A Delay-Tolerant Network Architecture for Challenged Internets", Proceedings ACM SIGCOMM'03, Feb. 26, 2003.

Z. J. Haas, J. Y. Halpern, L. Li, "Gossip-Based Ad Hoc Routing", IEEE/ACM Transactions on networking, vol. 14, No. 3, Jun. 2006.

I. Lysiuk, Z. Haas, "Controlled Gossiping in Ad Hoc Networks", Proceedings IEEE WCNC, 2010.

P. Basu, S. Guha, A. Swami, D. Towsley, "Percolation Phenomena in Networks under Random Dynamics", Proceedings COMSNETS, Jan. 2012.

B. Krishnamachari, S. Wicker, R. Bejar, "Phase Transition Phenomena in Wireless Ad Hoc Networks", Proceedings GlobeCom, Mar. 30, 2001.

J. Cartigny, D. Simplot, "Border Node Retransmission based Probabilistic Broadcast Protocols in Ad-Hoc Networks", Proceedings HICSS, 2003.

T. Spyropolous, K. Psounis, C. Raghvendra, "Spray and wait: an efficient routing scheme for intermittently connected mobile networks", Proceedings, ACM SIGCOMM WDTN 2005, Aug. 22, 2005.

Y. Sasson, D. Cavin, A. Schiper, "Probabilistic Broadest for Flooding in Wireless Mobile Ad Hoc Networks", Proceedings IEEE WCNC, 2002.

B. Williams, T. Camp, "Comparison of Broadcasting Techniques for Mobile Ad Hoc Networks", Proceedings MOBIHOC 2002, Mar. 15, 2002.

H. Lim, C. Kim, "Multicast Tree Construction and Flooding in Wireless Ad Hoc Networks", Proceedings ACM MSWIM, Aug. 2000.

S. Ni, Y. Tseng, Y. Chen, J. Sheu, "The broadcast storm problem in a mobile ad hoc network", Proceedings ACM MOBICOM, Aug. 1999.

Notification of Transmittal of the International Search Report and the Written Opinion of the International Searching Authority from corresponding PCT/US2014/038258 date Nov. 21, 2014.

Tsung-Chuan Huang et al: "Neighbor-Aware 1-22 Gossip-Based Broadcasting Scheme for Wireless Sensor Networks", Communications and Mobile Computing (CMC), 2010 International Conference on, IEEE. Piscataway, NJ, USA. Apr. 12, 2010, pp. 293-297.

Cha Seunghun et al: "Data delivery scheme for intermittently connected mobile sensor networks", Computer Communications, Elsevier Science Publishers BV, Amsterdam, NL, vol. 36, No. 5, Dec. 19, 2012, pp. 504-519.

Khanna Bakul et al: "Disrupted Adaptive Routing: Gossip-Based Routing in Delay-Tolerant Networks", MILCOM 2013-2013 IEEE Military Communications Conference, IEEE, Nov. 18, 2013, pp. 1099-1104.

Pradeep Kyasanur et al: "Smart Gossip: An Adaptive Gossip-based Broadcasting Service for Sensor Networks", Mobile Adhoc and Sensor Sysetems (MASS), 2006 IEEE International Conference on, IEEE, PI, Oct. 1, 2006, pp. 91-100.

Yue Cao et al: "Routing in Delay/Disruption Tolerant Networks: A Taxonomy, Survey and Challenges", IEEE Communications Surveys, IEEE, New York, NY, US, vol. 15, No. 2, Apr. 1, 2013, pp. 654-677.

\* cited by examiner

DISRUPTED ADAPTIVE ROUTING

RELATED APPLICATION

This application claims priority under 35 U.S.C. §119(e) to U.S. Provisional Application No. 61/824,595 entitled "DISRUPTED ADAPTIVE ROUTING," filed May 17, 2013, which is hereby incorporated by reference in its entirety for all purposes.

FEDERALLY SPONSORED RESEARCH

This invention was made with U.S. government support under Contract No. FA8750-07-C-0169(WAND/WNaN) awarded by the Defense Advanced Research Projects Agency (DARPA) STO. The U.S. government has certain rights in this invention.

BACKGROUND OF THE DISCLOSURE

1. Field of the Invention

Aspects of the present invention relate generally to transmission routing in dynamic networks.

2. Discussion of Related Art

Dynamic networks (e.g., such as a Mobile Ad hoc NETwork (MANET) or a Delay (or Disruption) Tolerant Network (DTN)) are networks in which the network topology may change over time. For example, in a dynamic network, nodes within the network may come and go and the configuration of nodes may change at any time. Such dynamic networks are commonly utilized in military, disaster recovery, and emergency response type situations.

MANETs are self-configuring dynamic networks in which each node within the network is free to move independently and thus each nodes links to other devices may change frequently. Each node in a MANET is capable of routing information on behalf of other nodes. Nodes within a MANET typically transmit data over defined end-to-end contemporaneous paths.

DTNs are similar to MANETs in that the nodes within a DTN are also able to route information on behalf of other nodes. However, in a DTN, transmission of data via end-to-end contemporaneous paths is the exception rather than the rule. For example, common DTNs typically employ store-and-forward mechanisms where a node may queue packets until a forwarding opportunity arises. As a result of the store-and-forward mechanisms, it is typically acceptable in a DTN for the transmission of data to be delayed.

SUMMARY

Embodiments described herein provide a scalable gossip-based DTN routing protocol, entitled Disrupted Adaptive Routing (DAR), where a node within a DTN probabilistically rebroadcasts packets to its neighbors to limit network transmissions and provide a relatively high delivery ratio. The gossip-based DAR protocol reduces the network transmission overhead by having each node forward packets based on at least one critical threshold at which the delivery ratio of a node is close to its highest level (but beyond which provides very little additional benefit to the delivery ratio) and at which a total number of transmissions by the node is close to a minimum number of transmissions necessary to achieve the relatively high delivery ratio. Applicant has appreciated that the critical threshold(s) of a node within a dynamic network may be based on certain network characteristics (e.g., network size or density).

In one example, the critical threshold variable is a critical gossip probability ($p_c$). By broadcasting packets from a node to a random subset of neighbors based on a fixed gossip probability of at least $p_c$, a delivery ratio close to a maximum level may be achieved. In addition, by broadcasting packets from a node to a random subset of neighbors based on a fixed gossip probability of at least $p_c$, the delivery ratio close to the maximum level may be achieved with a number of network transmissions that is close to a minimum number of network transmissions necessary to achieve the delivery ratio close to the maximum level.

In another example, the critical threshold variable is a critical packet lifetime ($t_c$). By assigning a packet lifetime (i.e., a time that the packet will exist in the network) to packets broadcast from a node, a delivery ratio close to a maximum level may be achieved while also reducing the number of transmissions by the node to a number that is close to a minimum number of transmissions necessary to achieve the high delivery ratio. In one embodiment, a packet lifetime is assigned to a sent packet, and the value of the packet lifetime is at least as long as the critical packet lifetime ($t_c$).

Additionally, the gossip-based DAR protocol may also reduce the network transmission overhead by including the random subset of neighbors within metadata (or within a packet header) of a packet transmitted by a node to inform other nodes of the transmission and reduce the need for separate control signals.

To accomplish one or more aspects of the present invention as described herein, a network device or node may be provided that is capable of evaluating characteristics of a network to determine a minimum number of nodes to forward data to, to ensure a high probability of delivery of the data. For instance, based on a determination of a number of nodes in a network and/or a density of a network, a network node may transmit a number of copies of the data to other nodes in the network to ensure a high probability of delivery of the data.

Further, in another embodiment, a network node may also evaluate characteristics of a network to determine a lifetime of the data such that a particular delivery probability is achieved. For example, based on a determination of a number of nodes in a network and/or a density of a network, the network node may communicate a specified lifetime of the data to exist in the network to other nodes. Such a data lifetime may maximize the probability that data will be delivered, yet will reduce the amount of time that the data is saved in the network to achieve the desired probability.

Aspects in accordance with the present invention are directed to a node configured to communicate with other nodes of a dynamic network, the node comprising a processor, a memory coupled to the processor, the memory including a predefined mapping, the predefined mapping correlating network characteristics to related critical thresholds at which a delivery ratio of the node is close to a maximum level and at which a total number of transmissions by the node is close to a minimum number necessary to achieve the delivery ratio, and a component coupled to the processor, the component configured to communicate with one-hop neighbors of the node and configured to determine at least one characteristic of the dynamic network based on information received from the one-hop neighbors of the node, wherein, in reference to the predefined mapping, the processor is configured to identify a critical threshold associated with the at least one characteristic of the network and is configured to transmit a first packet to at least one one-hop neighbor based on the critical threshold.

According to one embodiment, the critical thresholds of the predefined mapping include critical gossip probabilities.

In one embodiment, in reference to the predefined mapping, the processor is configured to identify a critical gossip probability associated with the at least one characteristic of the network and transmit the first packet to a group of the at least one one-hop neighbors, the group determined by the processor based on the critical gossip probability. In another embodiment, the processor is further configured to identify, within a portion of the first packet, the group of the at least one one-hop neighbors.

According to another embodiment, the critical thresholds of the predefined mapping include critical packet lifetimes. In one embodiment, in reference to the predefined mapping, the processor is configured to identify a critical packet lifetime associated with the at least one characteristic of the network, program the first packet with the critical packet lifetime, and transmit the first packet to the at least one one-hop neighbor of the node.

According to one embodiment, the processor is further configured to receive a second packet from a one-hop neighbor of the node, the second packet identifying, within a portion of the second packet, a group of intended recipients of the second packet. In one embodiment, the processor is further configured to determine whether the node is included within the group of intended recipients, and, in response to a determination that the node is included within the group of intended recipients, to forward the second packet to at least one one-hop neighbor based on the critical threshold.

According to another embodiment, the at least one characteristic of the network determined by the component is a size of the network. In another embodiment, the at least one characteristic of the network determined by the component is a node density of the network.

According to one embodiment, the component is further configured to periodically update the at least one characteristic of the dynamic network based on information received from the one-hope neighbors of the node and, in reference to the predefined mapping, the processor is further configured to adjust the critical threshold based on an updated at least one characteristic of the dynamic network.

Another aspect in accord with the present invention is directed to a method for transmitting packets between nodes of a dynamic network, the method comprising receiving, by a component of a first node, information from at least one one-hop neighbor of the first node, the information indicative of at least one characteristic of the dynamic network, referencing a predefined table stored in the first node, the predefined table correlating network characteristics to related critical thresholds at which a delivery ratio of the first node is close to a maximum level and at which a total number of transmissions by the first node is close to a minimum number necessary to achieve the delivery ratio, identifying, in response to referencing the predefined table, a critical threshold of the first node, and transmitting, by the first node, a packet to at least one one-hop neighbor of the first node based on the critical threshold.

According to one embodiment, identifying a critical threshold includes identifying, in reference to the predefined table, a critical gossip probability of the first node. In one embodiment, transmitting the packet to at least one one-hop neighbor of the first node includes transmitting the packet to a subset of the first nodes one-hop neighbors, the subset based on the critical gossip probability. In another embodiment, the method further comprises identifying, within a portion of the packet, the subset of the first nodes one-hop neighbors.

According to another embodiment, the method further comprises receiving, by a second node, the transmitted packet from the first node, determining, by the second node, whether the second node is included in the subset of nodes identified in the received packet, and in response to a determination, by the second node, that the second node is included in the subset of nodes identified in the received packet, forwarding the packet to at least one one-hop neighbor of the second node.

According to one embodiment, forwarding the packet to at least one one-hop neighbor of the second node comprises referencing a predefined table stored in the second node, the predefined table correlating network characteristics of the second node to related critical thresholds of the second node at which a delivery ratio of the second node is close to a maximum level and at which a total number of transmissions by the node is close to a minimum number of transmissions necessary to achieve the delivery ratio of the second node, identifying, in response to referencing the predefined table of the second node, a critical threshold of the second node; and transmitting, by the second node, the packet to the at least one one-hop neighbor of the second node based on the critical threshold of the second node.

According to another embodiment, identifying a critical threshold includes identifying, in reference to the predefined table, a critical packet lifetime of the first node. In one embodiment, the method further comprises assigning the critical packet lifetime to the packet.

According to one embodiment, receiving information indicative of at least one characteristic of the dynamic network includes receiving information indicative of at least one of a size of the dynamic network and a node density of the dynamic network. In another embodiment, the method further comprises generating the predefined table based on a plurality of network simulations including varying network characteristics.

One aspect in accord with the present invention is directed to a computer readable medium comprising computer-executable instructions that when executed on a processor performs a method for transmitting packets between nodes of a dynamic network, the method comprising receiving, by a component of a first node, information from at least one one-hop neighbor of the first node, the information indicative of at least one characteristic of the dynamic network, referencing a predefined table stored in the first node, the predefined table correlating network characteristics to related critical thresholds at which a delivery ratio of the first node is close to a maximum level and at which a total number of transmissions by the first node is close to a minimum number necessary to achieve the delivery ratio, identifying, in response to referencing the predefined table, a critical threshold of the first node, and transmitting, by the first node, a packet to at least one one-hop neighbor of the first node based on the critical threshold.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, it is commonly accepted in a DTN for the transmission of data to be somewhat delayed as DTNs typically employ store-and-forward mechanisms. Such store-and-forward mechanisms, in addition to reliability and disconnection problems commonly associated with links and nodes in a dynamic network, may make it difficult to successfully route transmissions in a DTN.

Accordingly, common DTN routing protocols utilize a variety of different solutions to achieve a high delivery ratio (i.e., a high percentage of successful transmissions). In one solution, a DTN routing protocol relies on network knowledge (e.g. node contact schedule, route history, location, mobility patterns, etc.) to broadcast packets only towards nodes that have a high probability of delivery. In such an embodiment, the number of network transmissions is reduced. However, the potential for transmission failure is relatively high as a failure in the nodes or links to which the relatively small number of packets are transmitted will likely result in transmission failure. In addition, this solution is unworkable in networks where network knowledge is unobtainable.

Another solution for achieving a high delivery ratio within a DTN is a multi-copy approach. For example, an extreme case of a multi-copy approach is epidemic routing, in which every node within the DTN floods received packets to all of its neighbors while storing a copy of every packet for future transmissions to any new neighbors. While an epidemic routing protocol achieves a high delivery ratio, it also leads to a high level of unnecessary packet rebroadcasts, and wasted bandwidth and memory resources. In addition, epidemic routing protocols are typically not scalable, as the traffic load or network size is increased, due to the high overhead of network transmissions.

Therefore, embodiments described herein provide a scalable gossip-based DTN routing protocol, entitled Disrupted Adaptive Routing (DAR), where a node within a DTN probabilistically broadcasts packets to its neighbors to limit network transmissions and provides a relatively high delivery ratio. The gossip-based DAR protocol reduces the network transmission overhead by having each node broadcast packets to a random subset of neighbors. The random subset of neighbors is generated based on a critical gossip probability at which the delivery ratio is close to its highest level but beyond which provides little additional benefit to the delivery ratio. Additionally, the critical gossip probability also corresponds to a number of transmissions that is close to a minimum number of network transmissions necessary to achieve a high delivery ratio.

Applicant has appreciated that nodes within a DTN typically share similar transmission coverage. By providing a protocol that includes randomly transmitting to some nodes (while randomly not transmitting to other nodes) based on a fixed probability, network resources may be saved without causing a reduction in delivery ratio.

Applicant has also appreciated that DTNs applying a gossip-based protocol exhibit a phase transition property. Associated with this phase transition property is a critical threshold, above which a desirable global property exists with a high probability. An example of a desirable global property is the node reachability, or delivery ratio. In other words, there exists a critical threshold variable at which the delivery ratio of a node is close to its highest level, but beyond which provides very little additional benefit to the delivery ratio.

In one example, the critical threshold variable is a critical gossip probability ($p_c$). By broadcasting packets from a node to a random subset of neighbors based on a fixed probability of at least $p_c$, a delivery ratio close to a maximum level may be achieved. In addition, by broadcasting packets from a node to a random subset of neighbors based on a fixed probability of at least $p_c$, the delivery ratio close to the maximum level may be achieved with a number of network transmissions that is close to a minimum number of network transmissions necessary to achieve the delivery ratio close to the maximum level. Also, broadcasting packets from the node to a random subset neighbors based on a fixed probability greater than $p_c$ will not substantially increase the delivery ratio. Alternatively, broadcasting packets from the node to a random subset of neighbors based on a fixed probability less than $p_c$ may substantially lower the delivery ratio.

According to one embodiment, broadcasting packets from a node to a random subset of neighbors based on the critical gossip probability ($p_c$) results in a delivery ratio that is between 80% and 100% of a maximum delivery ratio. In another embodiment, broadcasting packets from a node to a random subset of neighbors based on the critical gossip probability ($p_c$) results in a delivery ratio that is between 88% and 100% of a maximum delivery ratio. However, in other embodiments, broadcasting packets from a node to a random subset of neighbors based on the critical gossip probability ($p_c$) may result in a delivery ratio that is a different percentage of the maximum delivery ratio. Applicant has appreciated that the percentage of maximum delivery ratio provided by the critical gossip probability ($p_c$) may vary depending on properties or characteristics (e.g., size or density) of the network.

In another example, the critical threshold variable is a critical packet lifetime ($t_c$). By assigning a packet lifetime (i.e., a time that the packet will exist in the network) at least as long as $t_c$ to packets broadcast from a node, a delivery ratio close to a maximum level may be achieved while also reducing the number of transmissions by the node to a number that is close to a minimum number of transmissions necessary to achieve the high delivery ratio. Assigning a packet lifetime longer than $t_c$ to packets broadcast from a node will not substantially increase the delivery ratio. Alternatively, assigning a packet lifetime shorter than $t_c$ to packets broadcast from a node may substantially lower the delivery ratio.

Applicant has also appreciated that the critical threshold (i.e., the critical gossip probability ($p_c$) or critical packet lifetime ($t_c$)) of a DTN, above which a desirable global property exists with a high probability, may vary depending on certain properties or characteristics of the DTN such as the size of the DTN or the density of nodes within the DTN. For example, FIGS. 1A and 1B include graphs which illustrate the relationship between the critical gossip probability ($p_c$) of a DTN, the size of the DTN, and the density of nodes within the DTN. FIGS. 2A and 2B include graphs which illustrate the relationship between the critical packet lifetime ($t_c$) of a DTN, the size of the DTN, and the density of nodes within the DTN.

Figure 1A:
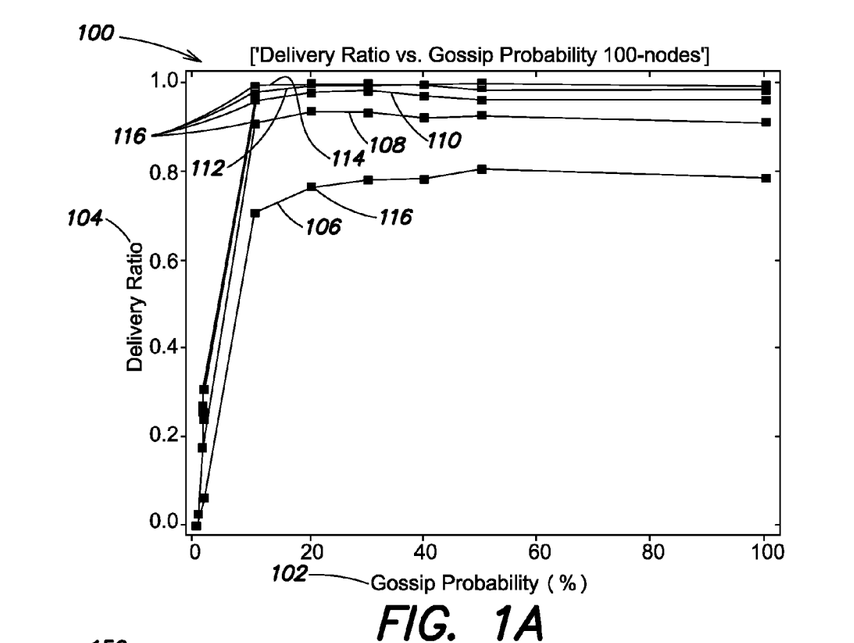
FIGS. 1A and 1B are graphs illustrating the relationship between a critical gossip probability ($p_c$) of a DTN, the size of the DTN, and the density of nodes within the DTN in accordance with one aspect of the present invention.
Figure 2A:
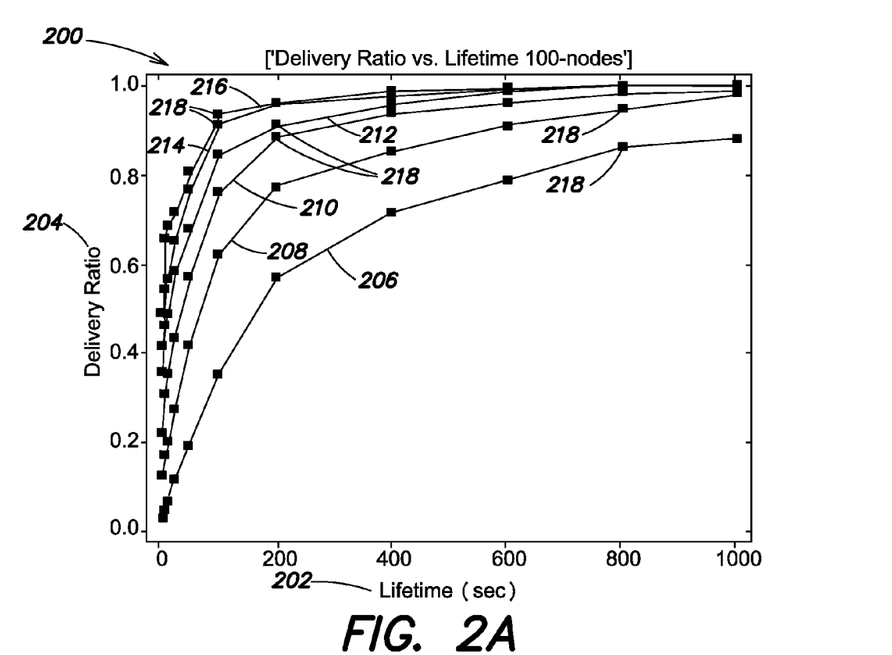
FIGS. 2A and 2B are graphs illustrating the relationship between a critical packet lifetime ($t_c$) of a DTN, the size of the DTN, and the density of nodes within the DTN in accordance with one embodiment of the present invention.
Figure 2B:
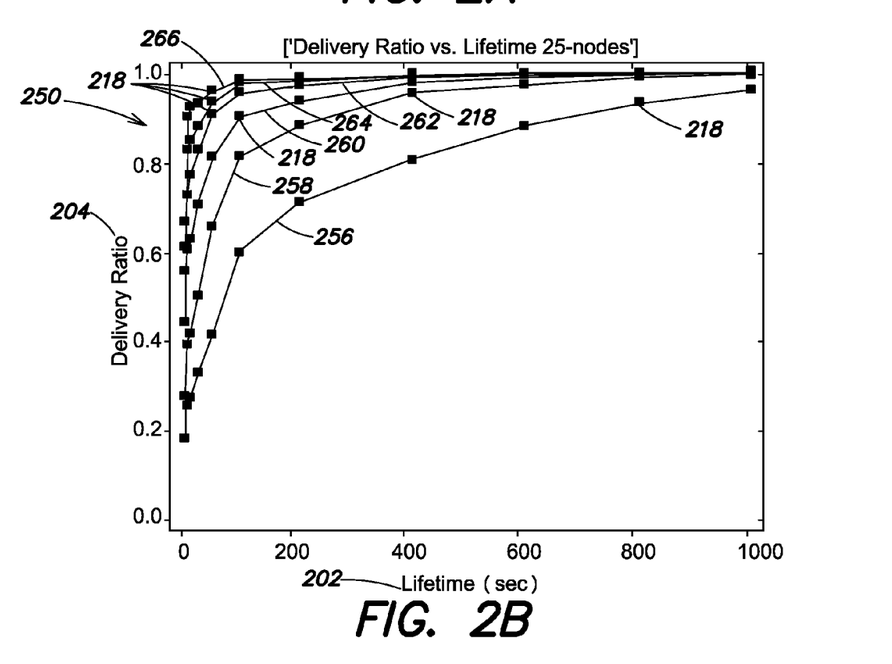

FIG. 1A includes a graph 100 that illustrates a relationship between gossip probability (shown on the x-axis 102), delivery ratio (shown on the y-axis 104), and density of nodes (in nodes/km$^2$) within a 100 node DTN. A first line 106 represents the relationship between delivery ratio 104 and gossip probability 102 in a 100 node DTN with a density of 500 nodes/km$^2$. A second line 108 represents the relationship between delivery ratio 104 and gossip probability 102 in a 100 node DTN with a density of 1000 nodes/km$^2$. A third line 110 represents the relationship between delivery ratio 104 and gossip probability 102 in a 100 node DTN with a density of 1500 nodes/km$^2$. A fourth line 112 represents the relationship between delivery ratio 104 and gossip probability 102 in a 100 node DTN with a density of 2000 nodes/km$^2$. A fifth line 114 represents the relationship between delivery ratio 104 and gossip probability 102 in a 100 node DTN with a density of 3000 nodes/km$^2$.

As can be seen in FIG. 1A, each DTN (represented by the different lines 106-114 in the graph 100) includes a critical gossip probability ($p_c$) 116 at which the delivery ratio 104 is close to its maximum value, above which the delivery ratio 104 will not substantially increase, and also at which the number of transmissions within the DTN is reduced (i.e., close to a minimum level necessary to achieve the high delivery ratio).

Figure 1B:
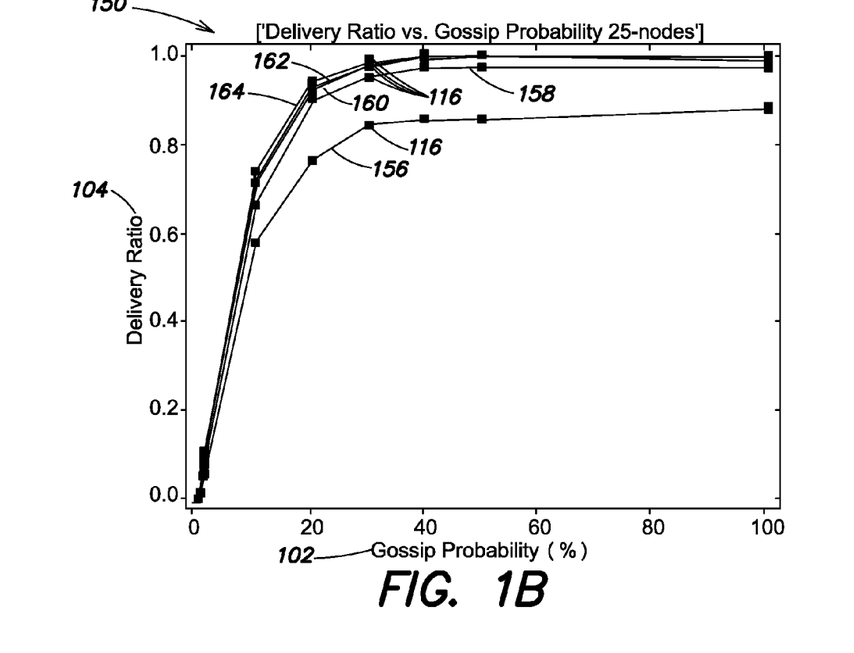

FIG. 1B includes a graph 150 that illustrates a relationship between gossip probability (shown on the x-axis 102), delivery ratio (shown on the y-axis 104), and density of nodes (in nodes/km$^2$) within a 25 node DTN. A first line 156 represents the relationship between delivery ratio 104 and gossip probability 102 in a 25 node DTN with a density of 500 nodes/km$^2$. A second line 158 represents the relationship between delivery ratio 104 and gossip probability 102 in a 25 node DTN with a density of 1000 nodes/km$^2$. A third line 160 represents the relationship between delivery ratio 104 and gossip probability 102 in a 25 node DTN with a density of 1500 nodes/km$^2$. A fourth line 162 represents the relationship between delivery ratio 104 and gossip probability 102 in a 25 node DTN with a density of 2000 nodes/km$^2$. A fifth line 164 represents the relationship between delivery ratio 104 and gossip probability 102 in a 25 node DTN with a density of 3000 nodes/km$^2$.

As can be seen in FIG. 1B, each DTN (represented by the different lines 156-164 in the graph 150) includes a critical gossip probability ($p_c$) 116 at which the delivery ratio 104 is close to its maximum value, above which the delivery ratio 104 will not substantially increase, and also at which the number of transmissions within the DTN is reduced (i.e., close to a minimum level necessary to achieve the high delivery ratio).

Applicant has appreciated that the critical gossip probability ($p_c$) 116 of a DTN varies based on the size of the DTN. As can be seen in FIGS. 1A and 1B, when the size of the DTN is increased, the critical gossip probability of the DTN decreases. For example, each one of the 100 node DTNs illustrated in FIG. 1A has a critical gossip probability less than the critical gossip probability of each one of the 25 node DTNs illustrated in FIG. 1B.

Applicant has also appreciated that the critical gossip probability ($p_c$) 116 of a DTN may also vary based on the density of nodes within a DTN. As can be seen in FIG. 1A, when the density of nodes within a DTN increases, the critical gossip probability decreases. For example, the DTN with the lowest density (i.e., the DTN with a density of 500 nodes/km$^2$ represented by the first line 106 in FIG. 1A) has a critical gossip probability ($p_c$) that is greater than the critical gossip probability ($p_c$) of each one of the DTNs with a higher density of nodes (i.e., the DTNs represented by lines 108, 110, 112 and 114).

FIG. 2A includes a graph 200 that illustrates a relationship between packet lifetime (in seconds, shown on the x-axis 202), delivery ratio (shown on the y-axis 204), and density of nodes (in nodes/km$^2$) within a 100 node DTN. A first line 206 represents the relationship between delivery ratio 204 and packet lifetime 202 in a 100 node DTN with a density of 500 nodes/km$^2$. A second line 208 represents the relationship between delivery ratio 204 and packet lifetime 202 in a 100 node DTN with a density of 1000 nodes/km$^2$. A third line 210 represents the relationship between delivery ratio 204 and packet lifetime 202 in a 100 node DTN with a density of 1500 nodes/km$^2$. A fourth line 212 represents the relationship between delivery ratio 204 and packet lifetime 202 in a 100 node DTN with a density of 2000 nodes/km$^2$. A fifth line 214 represents the relationship between delivery ratio 204 and packet lifetime 202 in a 100 node DTN with a density of 2500 nodes/km$^2$. A sixth line 216 represents the relationship between delivery ratio 204 and packet lifetime 202 in a 100 node DT with a density of 3000 nodes/km$^2$.

As can be seen in FIG. 2A, each DTN (represented by the different lines 206-216 in the graph 200) includes a critical packet lifetime ($t_c$) 218 at which the delivery ratio 204 is close to its maximum value, above which the delivery ratio 204 will not substantially increase, and also at which the number of transmissions within the DTN is reduced (i.e., close to a minimum level necessary to achieve the high delivery ratio).

FIG. 2B includes a graph 250 that illustrates a relationship between packet lifetime (in seconds, shown on the x-axis 202) of a 25 node DTN, delivery ratio (shown on the y-axis 204), and density of nodes (in nodes/km$^2$) within a 25 node DTN. A first line 256 represents the relationship between delivery ratio 204 and packet lifetime 202 in a 25 node DTN with a density of 500 nodes/km$^2$. A second line 258 represents the relationship between delivery ratio 204 and packet lifetime 202 in a 25 node DTN with a density of 1000 nodes/km$^2$. A third line 260 represents the relationship between delivery ratio 204 and packet lifetime 202 in a 25 node DTN with a density of 1500 nodes/km$^2$. A fourth line 262 represents the relationship between delivery ratio 204 and packet lifetime 202 in a 25 node DTN with a density of 2000 nodes/km$^2$. A fifth line 264 represents the relationship between delivery ratio 204 and packet lifetime 202 in a 25 node DTN with a density of 2500 nodes/km$^2$. A sixth line 266 represents the relationship between delivery ratio 204 and packet lifetime 202 in a 100 node DT with a density of 3000 nodes/km$^2$.

As can be seen in FIG. 2B, each DTN (represented by the different lines 256-266 in the graph 250) includes a critical packet lifetime ($t_c$) 218 at which the delivery ratio 204 is close to its maximum value, above which the delivery ratio 204 will not substantially increase, and also at which the number of transmissions within the DTN is reduced (i.e., close to a minimum level necessary to achieve the high delivery ratio).

Applicant has appreciated that the critical packet lifetime ($t_c$) 218 of a DTN generally varies based on the size of the DTN (especially at higher densities). As can be seen in FIGS. 2A and 2B, the critical packet lifetime 218 of a DTN may increase with an increase in network size. For example, the critical packet lifetime 218 of the 100 node DTN represented by the fourth line 212 in FIG. 2A is greater than the critical packet lifetime 218 of the 25 node DTN represented by the fourth line 262 in FIG. 2B.

Applicant has also appreciated that the critical packet lifetime ($t_c$) 218 of a DTN may also generally vary based on the density of nodes within a DTN. As can be seen in FIG. 2A, the critical packet lifetime 218 of a DTN may decrease with an increase in network density. For example, the DTN with the lowest density (i.e., the DTN with a density of 500 nodes/km$^2$ represented by the first line 206 in FIG. 2A) has a critical packet lifetime ($t_c$) that is greater than the critical packet lifetimes ($t_c$) of the DTNs with the highest density of nodes (i.e., the DTNs represented by lines 212, 214, and 216).

Accordingly, based on these relationships between the critical thresholds (e.g., critical gossip probability and critical packet lifetime) and network characteristics (e.g., network size and network density) as discussed above, associations between certain network characteristics and certain critical thresholds may be formulated. Therefore, based on a determined network characteristic, a node of a DTN may be configured to identify an associated critical threshold and broadcast based on that associated critical threshold. For example, by having a node of a DTN broadcast packets to a random subset of neighbors based on a critical threshold (gossip probability and/or critical packet lifetime) identified in response to a determined network characteristic (e.g., network size or density), the delivery ratio for transmissions by the node within the DTN may be increased to a high level (e.g., close to its maximum level) while at the same time the number of transmissions within the DTN may be reduced (e.g., close to a minimum level necessary to achieve the high delivery ratio).

Figure 3A:
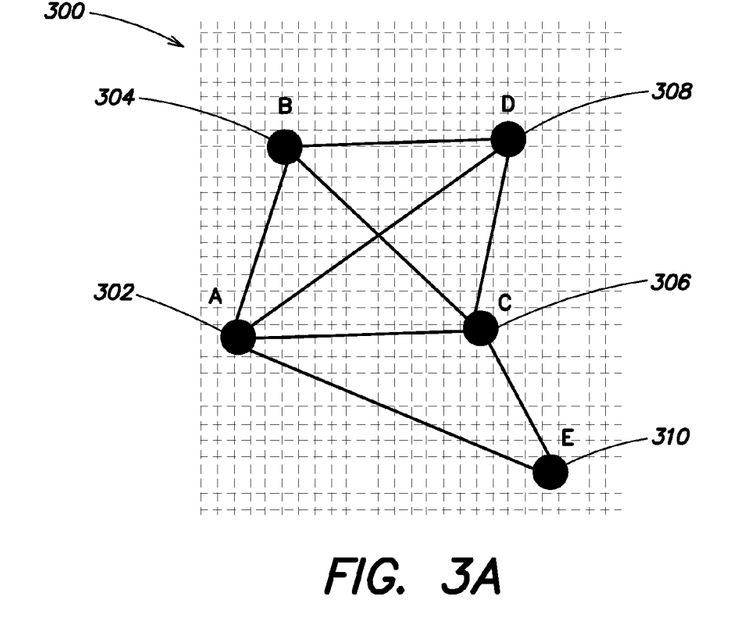
FIG. 3A illustrates a DTN in accordance with one embodiment of the present invention.

FIG. 3A illustrates a DTN 300 implementing a DAR based protocol as discussed above. The DTN 300 includes a plurality of nodes 302-310. Each node 302-310 is capable of broadcasting information to its neighbors, receiving information from its neighbors, and of forwarding received information on to its neighbors. According to one embodiment, each node 302-310 is assigned at least one critical threshold (e.g., a critical gossip probability ($p_c$) or a critical packet lifetime ($t_c$)), above which the delivery ratio of transmissions broadcast by the node is near a maximum level. As described above, the critical threshold may be determined based on characteristics of the DTN 300 such as the size of the network or the density of nodes within the network 300.

According to one embodiment, each node 302-310 within the network 300 includes at least one table, within a storage unit of the node, that maps at least one determined characteristic of the network 300 (e.g., such as the size of the network or density of nodes within the network) to a specific critical threshold (e.g., such as the critical gossip probability ($p_c$) or the critical packet lifetime ($t_c$) of the node. According to one embodiment, the mapping within each table is preprogrammed based on series of simulations that are run to determine the critical thresholds (e.g., the critical gossip probability or the critical packet lifetime) associated with different types of networks with different network characteristics (e.g., different sized networks or networks with different node densities).

For example, according to one embodiment, each node 302-310 within the network 300 includes a table that maps a determined network size and/or a determined node density of the network (as seen by the node) to a critical gossip probability ($p_c$) at which packets broadcast by the node should be transmitted. In another embodiment, each node 302-310 within the network 300 includes a table that maps a determined size and/or a determined node density of the network (as seen by the node) to a critical packet lifetime ($t_c$) which is intended to be assigned to packets sourced by the node and broadcast to other nodes.

When a node 302-310 attempts to transmit or forward a packet, the node determines at least one characteristic of the network 300, maps the determined characteristic(s) to at least one critical threshold defined in the pre-programmed table within the node, and transmits the data packet based on the critical threshold(s) defined in the tables. According to one embodiment, each node 302-310 determines the size of the network 300 based on a link state routing protocol. However, in other embodiments, any other appropriate method of determining the size of the network 300 may be utilized. According to another embodiment, each node 302-310 determines the density of nodes within the network 300 by determining the number of one-hop neighbors in communication with the node (i.e., the number of nodes in direct communication with the node). However, in other embodiments, any other appropriate method of determining the density of nodes within the network 300 may be utilized.

For example, in reference to FIG. 3A, when node A 302 attempts to transmit packets to a desired destination (e.g., node E 310), node A 302 first determines at least one characteristic (e.g., network size or node density) of the network 300. For instance, node A 302 may store a count of the number of nodes with which the node communicates. For example, node A 302 may maintain an address table (e.g., an Address Resolution Protocol (ARP) table) that records address information for various nodes on the network. The size of the network may be determined based on the count of the number of unique addresses within the table. Also, as the network changes over time (e.g., in ad hoc networks, nodes may be added/removed), the network size and/or density determination may be updated periodically by node A 302, and the number of nodes to which node A 302 communicates data to and the assigned packet lifetimes can be adjusted based on the updated network information.

In reference to the table(s) within the node 302, node A 302 determines at least one critical threshold (e.g., critical gossip probability or critical packet lifetime) based on the determined characteristic(s) of the network 300. For example, in one embodiment, node A 302 utilizes a pre-programmed table to map the determined size and/or density of the network 300 to a specific critical gossip probability ($p_c$). Based on the critical gossip probability ($p_c$) identified in the table, node A 302 determines how many nodes it should randomly transmit the packets to, to ensure the high (e.g., near maximum) delivery ratio of the packets to the desired destination. Upon randomly selecting nodes to which the packets will be sent (based on the critical gossip probability ($p_c$)), node A 302 identifies the intended recipients within the metadata (or as a header) of the packets and transmits the packets to the intended recipients (e.g., nodes B 304 and D 308) using a MAC-layer broadcast.

According to one embodiment, as node A 302 is a source node, node A 302 also utilizes a pre-programmed table to map the determined size and/or density of the network 300 to a specific critical packet lifetime ($t_c$). Prior to transmitting packets to any intended recipients, node A 302 programs packets to have a lifetime equal to the critical packet lifetime ($t_c$).

Upon receiving packets from node A 302 in which it is not identified (in the metadata or packet header) as an intended recipient, node C 306 is allowed to locally deliver the packets (if appropriate), but is not allowed to rebroadcast or forward the received packets.

Upon receiving packets from node A 302 in which they are identified (in the metadata or packet header) as intended recipients, nodes B 304 and D 308 are allowed to rebroadcast (or forward) the received packets to other nodes. As similarly described above with regards to node A 302, each of nodes B 304 and D 308 determines at least one characteristic of the network 300 (e.g., a network size or node density), maps the determined characteristic(s) to a critical gossip probability ($p_c$) defined in a pre-programmed table within the node, and forwards the received packets based on the critical gossip probability ($p_c$). As described above, each of nodes B 304 and D 308 selects a random number of nodes to forward the received packets to (based on the critical gossip probability ($p_c$)). Upon randomly selecting nodes to which the packets will be sent (based on the critical gossip probability ($p_c$)), nodes B 304 and D 308 identify the intended recipients within the metadata (or as a header) of the packets and transmit the packets to the intended recipients using a MAC-layer broadcast.

Packets may be forwarded amongst nodes of the network 300 as discussed above until the packets reach the desired destination (node E 310). By forwarding packets based on a critical gossip probability and/or a critical packet lifetime, a high (e.g., near maximum) delivery ration may be achieved while at the same time reducing the number of transmissions within the network 300.

According to one embodiment, a DTN 300 implementing the DAR based protocol may also implement additional flooding optimization techniques to enhance the delivery ratio while simultaneously reducing the number of transmissions within the network 300. For example, in one embodiment, the DTN 300 also utilizes a self-pruning flooding optimization technique in which redundant transmissions are reduced.

According to one embodiment, the nodes 302-310 are configured to utilize the metadata and header information in received packets to implement a self-pruning optimization technique to reduce redundant transmissions within the network 300. For example, as discussed above, upon receiving packets from node A 302 in which they are identified (in the metadata or packet header) as intended recipients, nodes B 304 and D 308 are allowed to rebroadcast (or forward) the received packets to other nodes. As also discussed above, nodes B 304 and D 308 each identify their own intended forwarding recipients based on their own critical gossip probability ($p_c$). According to one embodiment, as the intended forwarding recipients of each node are randomly generated based on the critical gossip probabilities of the nodes, the intended recipients of each of nodes B 304 and D 308 may include at least one same node. For example, as seen in FIG. 3A, both node B 304 and node D 308 may need to forward packets to node C 306.

By utilizing a self-pruning optimization technique, nodes B 304 and D 308 may eliminate a redundant transmission of packets to node C 306. For example, prior to forwarding received packets to node C 306, each of nodes B 304 and D 308 may implement random jitter (e.g., a Random Assessment Delay (RAD)). As the RAD of each of the nodes B 304 and D 308 passes, node B 304 and node D 308 both attempt to forward the received packets to intended recipient node C 306. However, as the RAD of each node is different, one node (B 304 or D 308) may forward packets to node C 306 before the RAD of the other node has passed.

For example, in such a situation where both node B 304 and node D 308 need to forward packets to node C 306, and node D 308 has already forwarded packets (including metadata or a packet header indicating node C 306 as an intended recipient) to node C 306 (while node B 304 is waiting for its RAD to pass), node B 304 overhears the transmission from node D 308 to node C 306. Node B 304 is not identified in the metadata or packet header as an intended recipient from node D 308, so node B 304 does not forward the packets from node D 308. However, node B 304 does identify, in the metadata or packet header of the forwarded packet from node D 308, that node C 306 is an intended recipient. As node C 306 is also an intended recipient of node B 304 (for packets forwarded from node A 302), node B 304 cancels its own transmission of packets to node C 306. Accordingly, a redundant transmission to node C 306 may be eliminated and the number of transmissions within the network 300 may be reduced. Node C 306 may forward packets in the same manner as discussed above.

According to one embodiment, the nodes 302-310 in the network 300 may also track nodes that move out of range of other nodes in the network 300. For example, as seen in relation to FIG. 3B, when node A 302 desires to transmit to node E 310 (e.g., because node E 310 is a random recipient for packet forwarding identified by node A 302 based on the critical gossip probability ($p_c$) of node A 302), but node E 310 is out of range of node A 302, node A 302 remembers that node E 310 is down and creates a "packet, node" association in relation to the failed node E 310 within a storage unit of node A 302. If node C 306 receives packets identifying it as an intended recipient (e.g., based on the metadata or packet headers within the packets) and desires to forward the received packets to node E 310 (e.g., because node E 310 is a random recipient for packet forwarding identified by node C 306 based on the critical gossip probability ($p_c$) of node C 306), node C 306 will also realize that node E 310 is out of range. As a result, node C 306 will also remember that node E 310 is down and create a "packet, node" association in relation to the failed node E 310 within a storage unit of node C 306.

Figure 3B:
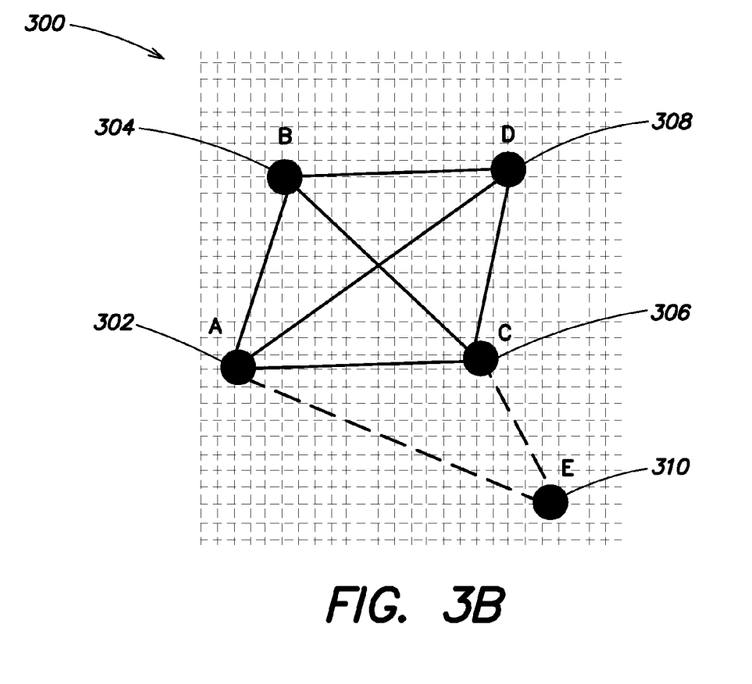
FIG. 3B illustrates a DTN with an out of range node in accordance with one embodiment of the present invention.

When node E 310 comes back into range, both node A 302 and node C 306 identify, based on their "packet, node" associations, that they are currently storing a packet that must be sent to node E 310. After each introducing a RAD, both node A 302 and node C 306 attempt to transmit the stored packet to node E 310. However, as the RAD of each node is different, one node (A 302 or C 306) may forward packets to node E 310 before the RAD of the other node has passed.

For example, in such a situation where both node A 302 and node C 306 need to forward packets to node E 310 and node C 306 has already forwarded packets (including metadata or a packet header indicating node E 310 is an intended recipient) to node E 310 (while node A 302 is waiting for its RAD to pass), node A 302 overhears the transmission from node C 306 to node E 310. Node A 302 is not identified in the metadata or packet header as an intended recipient so node A 302 does not forward the packets from node C 306. However, node A 302 does identify, in the metadata or packet header of the forwarded packet from node C 306, that node E 310 is an intended recipient. As node E 310 is also an intended recipient of node A 302, node A 302 cancels its own transmission of packets to node E 310. Accordingly, a redundant transmission to node E 310 may be eliminated and the number of transmissions within the network 300 may be reduced.

By generating a list of intended recipients of a node (based on the critical gossip probability ($p_c$)) and including the list of intended recipients as metadata or a packet header within a packet to be transmitted by the node as discussed above, the need for separate control packets is reduced as information regarding the nodes and the transmissions is automatically sent along with each packet. Accordingly, the number of transmissions within the network 300 may be reduced while still providing a high delivery ratio.

Figure 4:
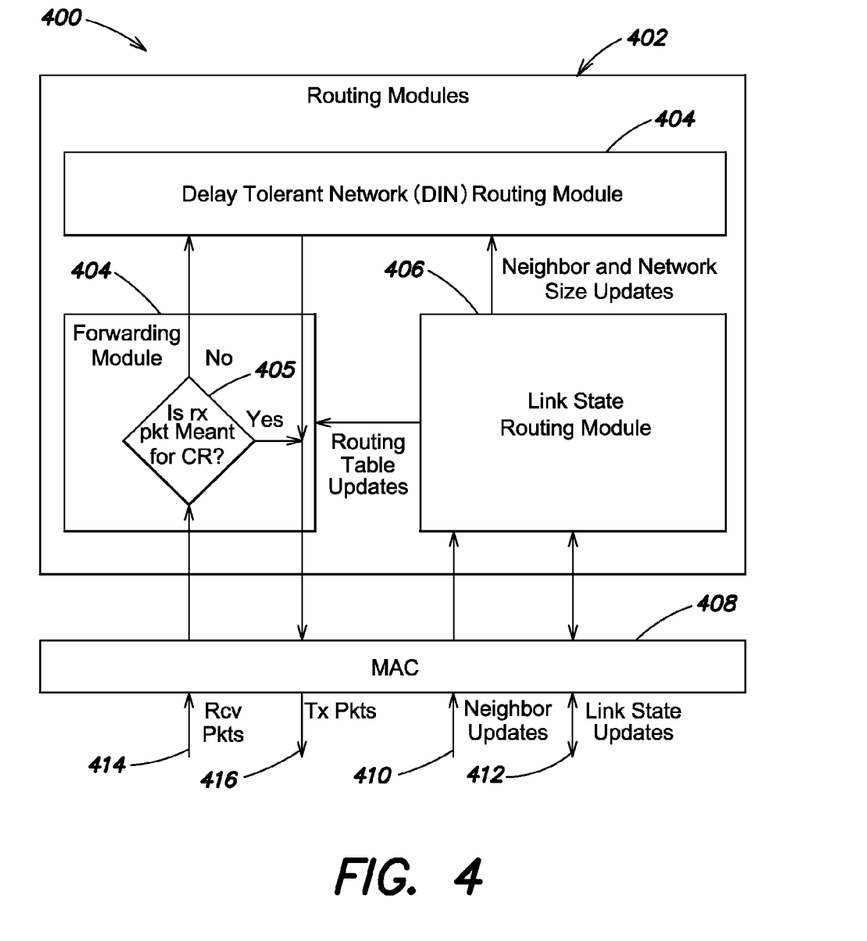
FIG. 4 is a block diagram of a node within a DTN in accordance with one aspect of the present invention.

FIG. 4 is a block diagram of one embodiment of a node 400 capable of implementing a DAR based protocol within a DTN (e.g., such as the DTN 300 of FIGS. 3A and 3B). The node 400 includes a routing module 402. The routing module 402 includes a DTN routing module 404, a forwarding module 409, and a link state routing module 406. The forwarding module 409 is coupled to the DTN routing module 404. The link state routing module 406 is coupled to the forwarding module 409 and the DTN routing module 404.

The DAR based protocol, as discussed above, is implemented by the DTN routing module 404. The DTN routing module 404 receives one-hop neighbor (i.e., neighbors in direct communication with the node 400) and network size updates 407 from the link state routing module 406.

The link state routing module 406 receives MAC layer 408 updates 410 from the one-hop neighbors of the node 400, the updates 410 providing the link state routing module 406 with information regarding the number of one-hop neighbors in communication with the node 400. This information may be utilized to determine the density of nodes within the network of the node 400, as described above. The link state routing module 406 may also receive MAC layer 408 link state updates 412 from the link state routing modules of other nodes. The link state updates may be utilized to determine the size of the network of the node 400, as described above. For example, in one embodiment, the node 400 determines the size of the network based on the other nodes it "sees" (i.e., the other nodes it has received link state updates 412 from). Based on the link state updates 412, the node 400 is able to generate a "map" of the network and determine the size of the network.

Applicant has appreciated that as the network is forming, the link state updates 412 and the one-hop neighbor information 410 is in the process of being exchanged between nodes and it may take some time for the link state routing module 406 to generate a complete list of one-hop neighbors and an accurate network size. Accordingly, as the network density (based on the number of one-hop neighbors) and the network size are utilized in the DAR based protocol within the DTN routing module 404 to compute the critical gossip probability ($p_c$) and/or the critical packet lifetime ($t_c$), the DTN routing module 404 may initially calculate a critical gossip probability ($p_c$) and/or a critical packet lifetime ($t_c$) based on a smaller network size and lower number of one-hop neighbors than is actually present in the network. However, despite this miscalculation, there is no loss of functionality (i.e., a lower delivery ratio) as the miscalculation will only result in a higher critical gossip probability ($p_c$) and/or a higher critical packet lifetime ($t_c$) as compared to the critical gossip probability ($p_c$) and/or the critical packet lifetime ($t_c$) calculated when the network is fully formed. Such a higher critical gossip probability ($p_c$) and/or a higher critical packet lifetime ($t_c$) will merely result in an increased delivery ratio.

The node 400 receives MAC layer 408 packets 414 from a local source or from another node within the network. The MAC layer 408 received packets 414 are passed to the forwarding module 409. The forwarding module 409 makes a determination 405 whether a received packet 414 is eligible for DAR protocol based treatment by the DTN routing module 404 or for treatment using traditional Connected Routing (CR) mechanisms. For example, according to one embodiment, a Type of Service (ToS) field in the header of received packets indicates whether the packet is eligible for treatment by the DTN routing module 404. Certain real time packets may not be eligible for treatment by the DTN routing module 404 as they require immediate transmission and cannot be delayed. In response to a determination that a received packet 414 is meant for traditional CR mechanisms (and not for treatment via the DTN routing module 404), the packet is transmitted as a MAC layer 408 unicast or broadcast 416 as instructed by the appropriate CR mechanisms.

In response to a determination that a received packet 414 is not meant for traditional CR mechanisms but is instead appropriate for treatment by the DTN routing module 404, the received packet 414 is passed to the DTN routing module 404. For a received packet, the DAR protocol based DTN routing module 404 examines the list of intended recipients within the metadata or packet header of the received packet and determines if it is an intended recipient. If the node 400 is not an intended recipient, the DTN routing module 404 does not forward the packet. If the node 400 is an intended recipient, the DTN routing module 404 attempts to broadcast or forward the packet.

To transmit the packet, the DTN routing module 404 references the network size and neighbor information 407 received from the link state routing module 406 against a predefined table to determine an appropriate critical gossip probability ($p_c$) and/or critical packet lifetime ($t_c$) of the node 400. Based on the determined critical gossip probability ($p_c$), the DTN routing module 404 selects a subset of its one-hop neighbors as intended recipients and lists the subset of one-hop neighbors in the metadata (or packet header) of the packet. Additionally, if the node 400 sources the packet, the DTN routing module 404 also sets the packet lifetime field of the packet based on the critical packet lifetime ($t_c$).

The DTN routing module 404 checks any overheard transmissions from other nodes within the network to determine if the packet has been previously transmitted to any of the intended recipients within the subset by another node within the network. If the packet has previously been transmitted to one of the intended recipients, the DTN routing module 404 cancels a redundant transmission of the packet to that intended recipient. If the packet has not previously been transmitted to an intended recipient, the DTN routing module 404 transmits the packet to the intended recipient via a MAC layer 408 broadcast 416.

According to one embodiment, the DTN routing module 404 also periodically monitors stored packets, for the purpose of expiring any packets that have exceed their packet lifetimes. According to another embodiment, the forwarding module 409 also performs duplicate packet detection and discards any received duplicative packets, only informing the DTN routing module 404 about unique packets.

Figure 5:
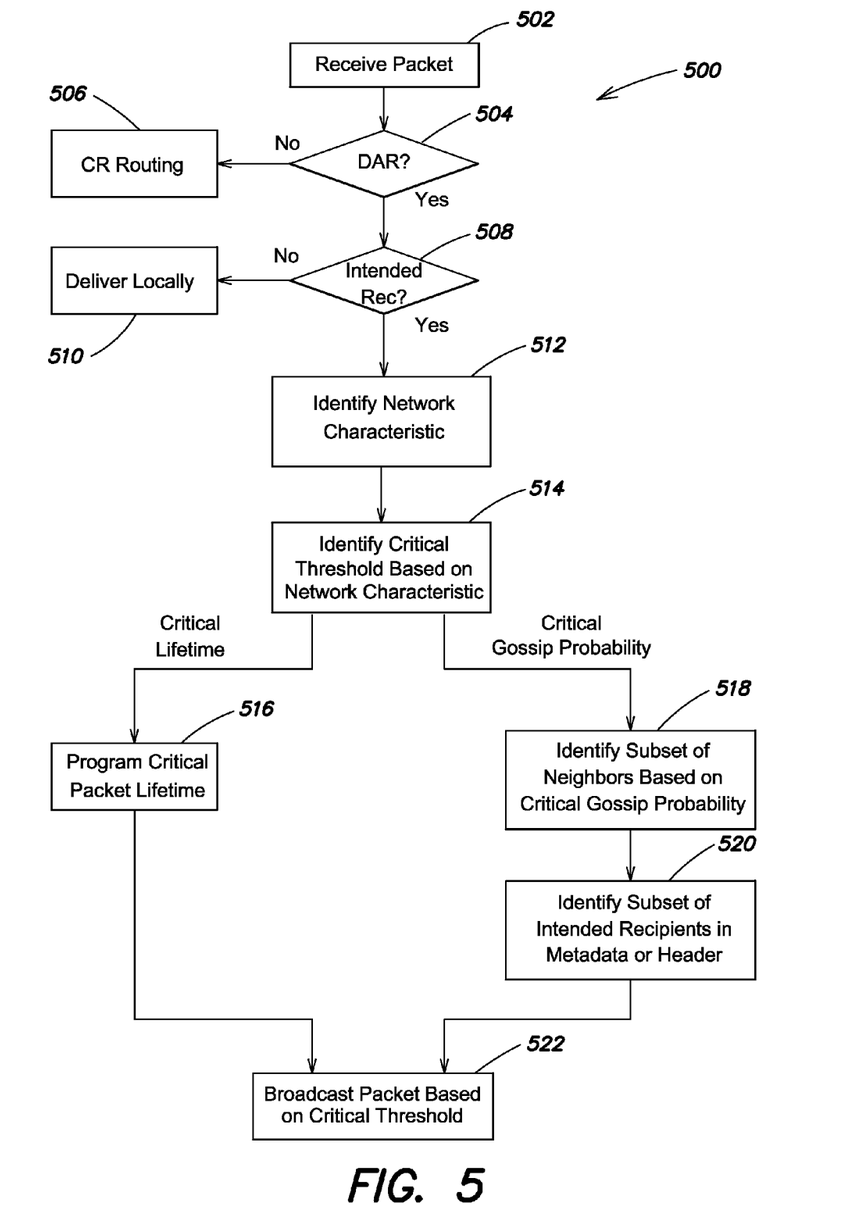
FIG. 5 is a flow chart illustrating a process for broadcasting packets from a node of a DTN in accordance with one aspect of the present invention.

The broadcast of packets from the node 400 is discussed in greater detail below with regards to FIG. 5. FIG. 5 illustrates a flow chart 500 of a process for broadcasting packets from a node 400 of a DTN as described herein.

At block 502, the node 400 receives a packet. The packet may be received from a neighbor of the node 400 as a MAC layer unicast or broadcast or it may be sourced locally. At block 504 a decision is made, e.g., by the forwarding module 409, whether the received packet is eligible for DAR protocol based treatment, e.g., by the DTN routing module 404. In response to a determination that the received packet is not eligible for DAR protocol based treatment (e.g., because its transmission cannot be delayed), at block 506 the packet is transmitted as a MAC layer unicast or broadcast as instructed by the appropriate CR mechanisms.

In response to a determination that the received packet is eligible for DAR protocol based treatment, at block 508, the received packet is passed to the DTN routing module 404 and a determination is made whether the node 400 is an intended recipient of the received packet. According to one embodiment, the DTN routing module 404 checks the metadata (or packet header) of the received packet to identify whether the node 400 is identified in the metadata (or packet header) as an intended recipient. In response to a determination that the node 400 is not an intended recipient, at block 510 the packet is not broadcast by the node 400 and it is locally delivered (if possible).

In response to a determination that the node 400 is an intended recipient of the packet (e.g., because the node 400 is listed in the metadata or packet header of the packet), the node 400 attempts to broadcast the packet. At block 512, the node 400 identifies at least one characteristic of the DTN. As described above, according to one embodiment, a link state module 406 within the node 400 receives information from one-hop neighbors of the node 400 and based on this information, provides the DTN routing module 404 with information regarding at least one characteristic of the DTN (e.g., the size of the DTN or the node density of the DTN).

At block 514, based on the at least one identified network characteristic, the DTN routing module 404 references a predefined mapping or table within the node that correlates network characteristics (e.g., network size and/or density) to critical thresholds. As described above, the critical thresholds within the predefined mapping may include critical gossip probabilities ($p_c$) and/or critical packet lifetimes ($t_c$). Based on the identified network characteristics and the predefined mapping, the DTN routing module 404 identifies at least one corresponding critical threshold at which the delivery ratio of the node is close to its highest level (but beyond which provides very little additional benefit to the delivery ratio) and at which a total number of transmissions by the node is close to a minimum number of transmissions necessary to achieve the relatively high delivery ratio.

At block 516, if one of the identified critical thresholds is a critical packet lifetime ($t_c$) and the node 400 is a source node, the packet is programmed with a packet lifetime equal to the critical packet lifetime ($t_c$).

At block 518, if one of the identified critical thresholds is a critical gossip probability ($p_c$), the DTN routing module 404 identifies a random subset of one-hop neighbors of the node 400, the number of one-hop neighbors within the subset determined based on the critical gossip probability ($p_c$). At block 520, the subset of one-hop neighbors (i.e. the intended recipients) is identified within a portion of the packet (e.g., in the metadata or packet header of the packet).

At block 522, the packet is transmitted or forwarded as a MAC layer unicast or broadcast transmission based on the critical threshold(s) (e.g., programmed with the critical packet lifetime ($t_c$) and/or broadcast with a list of intended recipients determined based on the critical gossip probability ($p_c$). For example, according to one embodiment, the packet is transmitted simultaneously to each one of the subset of one-hop neighbors as a single broadcast transmission. In another embodiment, the packet is transmitted individually to each one of the subset of one-hope neighbors as a plurality of unicast transmissions.

According to one embodiment, the node 400 may transmit a packet as either a broadcast transmission or a unicast transmission based on a network characteristic identified by the link state module 406. For example, the node 400 may transmit a packet as a single broadcast transmission in response to a determination that the number of one-hop neighbors of the node 400 is greater than a threshold number of one-hop neighbors. Alternatively, the node 400 may transmit a packet as, at least one, unicast transmission in response to a determination that the number of one-hop neighbors of the node 400 is less than a threshold number of one-hop neighbors.

Various embodiments according to the present invention may be implemented on one or more computer systems or other devices. A computer system may be a single computer that may include a minicomputer, a mainframe, a server, a personal computer, a networking device such as a switch or router, or a combination thereof. The computer system may include any type of system capable of performing remote computing operations (e.g., cell phone, PDA, tablet, smartphone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 6:
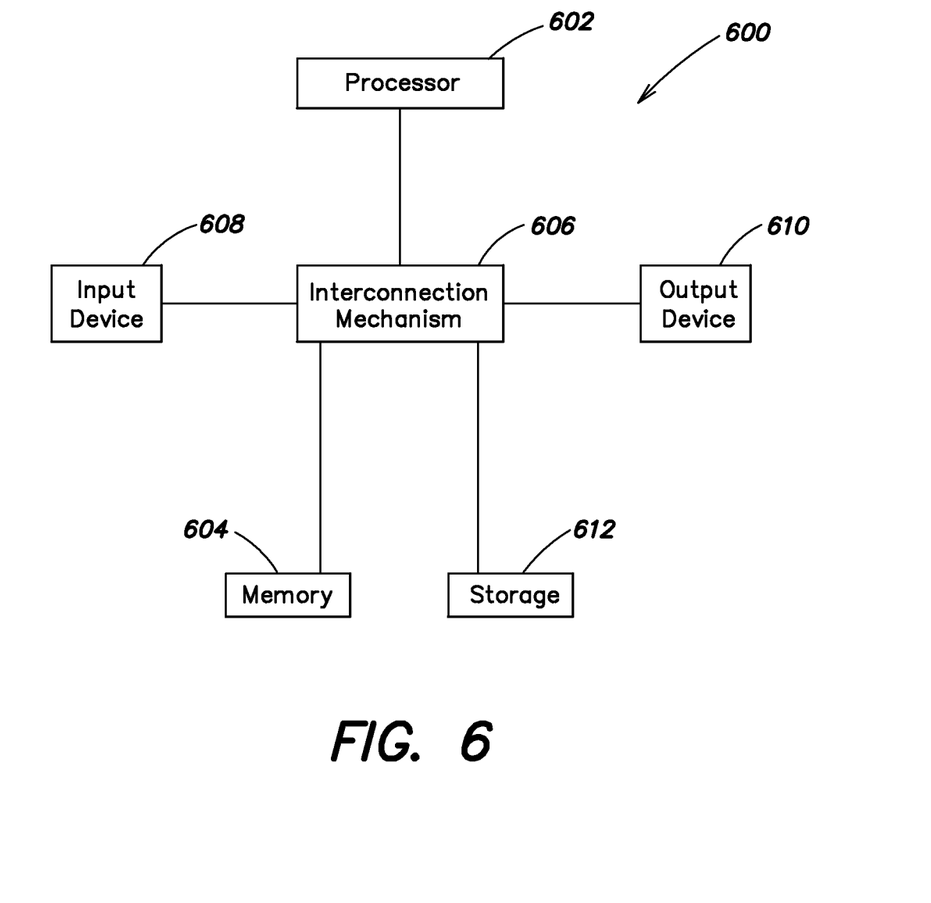
FIG. 6 is a block diagram of a general-purpose computer system upon which various embodiments of the invention may be implemented.

For example, various aspects of the invention may be implemented as specialized software executing in a general-purpose computer system 600 such as that shown in FIG. 6. The computer system 600 may include a processor 602 connected to one or more memory devices (i.e., data storage) 604, such as a disk drive, memory, or other device for storing data. Memory 604 is typically used for storing programs and data during operation of the computer system 600. Components of computer system 600 may be coupled by an interconnection mechanism 606, which may include one or more busses (e.g., between components that are integrated within a same machine) and/or a network (e.g., between components that reside on separate discrete machines). The interconnection mechanism 606 enables communications (e.g., data, instructions) to be exchanged between system components of system 600. Computer system 600 also includes one or more input devices 608, for example, a keyboard, mouse, trackball, microphone, touch screen, and one or more output devices 610, for example, a printing device, display screen, and/or speaker. In addition, computer system 600 may contain one or more interfaces (not shown) that connect computer system 600 to a communication network (in addition or as an alternative to the interconnection mechanism 606).

Figure 7:
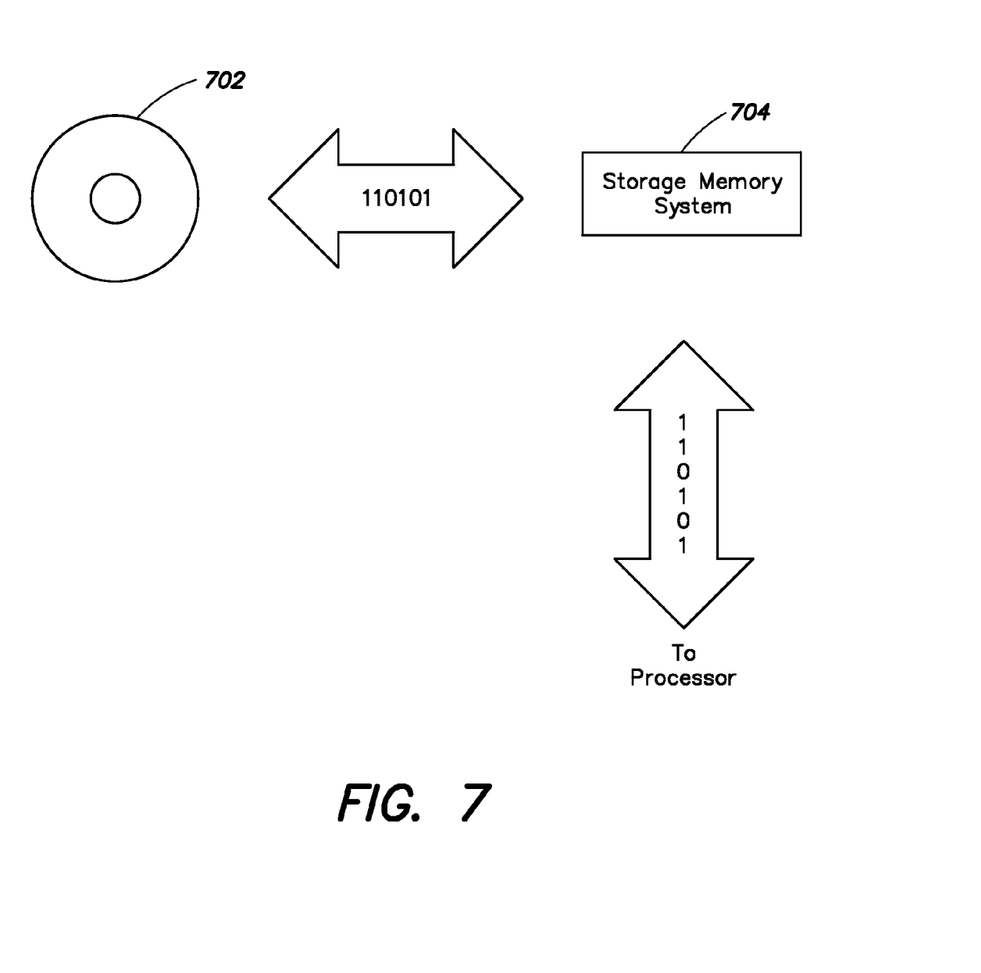
FIG. 7 is a block diagram of a computer data storage system with which various embodiments of the invention may be practiced.

The storage system 612, shown in greater detail in FIG. 7, typically includes a computer readable and writeable nonvolatile recording medium 702 in which signals are stored that define a program to be executed by the processor or information stored on or in the medium 702 to be processed by the program. The medium may, for example, be a disk or flash memory. Typically, in operation, the processor causes data to be read from the nonvolatile recording medium 702 into another memory 704 that allows for faster access to the information by the processor than does the medium 702. This memory 704 is typically a volatile, random access memory such as a dynamic random access memory (DRAM) or static memory (SRAM). It may be located in storage system 612, as shown, or in memory system 604. The processor 602 generally manipulates the data within the integrated circuit memory 604, 704 and then copies the data to the medium 702 after processing is completed. A variety of mechanisms are known for managing data movement between the medium 702 and the integrated circuit memory element 604, 704, and the invention is not limited thereto. The invention is not limited to a particular memory system 604 or storage system 612.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 may be also implemented using specially programmed, special purpose hardware. In computer system 600, processor 602 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described herein, the phase transition property for delivery ratio has been observed in dynamic networks when gossip probability or packet lifetime is varied. According to some embodiments, the DAR based protocol can be based on critical gossip probabilities, critical packet lifetimes, or both.

As described herein, the DAR based protocol is utilized with a DTN; however, in other embodiments, the DAR based protocol may also be utilized with other types of dynamic networks, such as a MANET, a wired dynamic network, or a peer to peer network. In addition, the DAR based protocol described above may be utilized with a wireless or wired network.

As described herein, a table is used to map determined characteristics of a network (e.g., size and/or density) to a critical threshold such as critical gossip probability or critical packet lifetime. According to one embodiment, the table is a simple lookup table; however, in other embodiments, other types of tables may be used.

As described herein, the DAR based protocol is utilized with a self-pruning optimization technique; however, in other embodiments, the DAR based protocol may be used in combination with other existing mechanisms for network-wide broadcasting optimizations such as counter-based schemes, distance-based schemes, location-based schemes, a scalable-broadcast algorithm, dominant pruning, multipoint relaying, CDS-based algorithm, lightweight and efficient network-wide broadcast, or any other type of broadcast optimization technique.

As described herein, each node receives one-hop neighbor information to assist in performing these optimizations; however, in other embodiments, a node may receive two-hop neighbor information to assist in performing other optimizations.

Accordingly, embodiments described herein provide a scalable gossip-based DTN routing protocol, entitled Disrupted Adaptive Routing (DAR), where a node within a DTN probabilistically rebroadcasts packets to its neighbors to limit network transmissions and provide a relatively high delivery ratio. The gossip-based DAR protocol reduces the network transmission overhead by having each node forward packets to a random subset of neighbors. The random subset of neighbors is generated based on a critical gossip probability at which the delivery ratio is close to its highest level but beyond which provides little additional benefit to the delivery ratio. In addition, by broadcasting packets from a node to a random subset of neighbors based on a critical gossip probability, the delivery ratio close to the maximum level may be achieved with a number of network transmissions that is close to a minimum number of network transmissions necessary to achieve the high delivery ratio.

The gossip-based DAR protocol may also reduce the network transmission overhead by having source nodes program packets with a packet lifetime based on a critical packet lifetime at which the delivery ratio is close to its highest level but beyond which provides little additional benefit to the delivery ratio. Additionally, the gossip-based DAR protocol may also reduce the network transmission overhead by including the random subset of neighbors within metadata (or within a packet header) of a packet transmitted by a node to inform other nodes of the transmission and reduce the need for separate control signals.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A node configured to communicate with other nodes of a dynamic network, the node comprising:
    a processor;
    a memory coupled to the processor, the memory including a predefined mapping, the predefined mapping correlating network characteristics to related critical thresholds at which a delivery ratio of the node is close to a maximum level and at which a total number of transmissions by the node is close to a minimum number necessary to achieve the delivery ratio; and
    a component coupled to the processor, the component configured to communicate with one-hop neighbors of the node and configured to determine at least one characteristic of the dynamic network based on information received from the one-hop neighbors of the node,
    wherein, in reference to the predefined mapping, the processor is configured to identify one of the related critical thresholds in the predefined mapping associated with the at least one characteristic of the network and is configured to transmit a first packet to at least one one-hop neighbor based on the identified critical threshold, and
    wherein the related critical thresholds of the predefined mapping include critical gossip probabilities.

2. The node of claim 1, wherein, in reference to the predefined mapping, the processor is configured to identify a critical gossip probability associated with the at least one characteristic of the network and to transmit the first packet to a group of the at least one one-hop neighbors, the group determined by the processor based on the critical gossip probability.

3. The node of claim 2, wherein the processor is further configured to identify, within a portion of the first packet, the group of the at least one one-hop neighbors.

4. A node configured to communicate with other nodes of a dynamic network, the node comprising:
    a processor;
    a memory coupled to the processor, the memory including a predefined mapping, the predefined mapping correlating network characteristics to related critical thresholds at which a delivery ratio of the node is close to a maximum level and at which a total number of transmissions by the node is close to a minimum number necessary to achieve the delivery ratio; and
    a component coupled to the processor, the component configured to communicate with one-hop neighbors of the node and configured to determine at least one characteristic of the dynamic network based on information received from the one-hop neighbors of the node,
    wherein, in reference to the predefined mapping, the processor is configured to identify one of the related critical thresholds in the predefined mapping associated with the at least one characteristic of the network and configured to transmit a first packet to at least one one-hop neighbor based on the identified critical threshold, and
    wherein the related critical thresholds of the predefined mapping include critical packet lifetimes.

5. The node of claim 4, wherein, in reference to the predefined mapping, the processor is configured to identify a critical packet lifetime associated with the at least one characteristic of the network, program the first packet with the critical packet lifetime, and transmit the first packet to the at least one one-hop neighbor of the node.

6. The node of claim 4, wherein the processor is further configured to receive a second packet from a one-hop neighbor of the node, the second packet identifying, within a portion of the second packet, a group of intended recipients of the second packet.

7. The node of claim 6, wherein the processor is further configured to determine whether the node is included within the group of intended recipients, and, in response to a determination that the node is included within the group of intended recipients, to forward the second packet to at least one one-hop neighbor based on the identified critical threshold.

8. The node of claim 4, wherein the at least one characteristic of the network determined by the component is a size of the network.

9. The node of claim 4, wherein the at least one characteristic of the network determined by the component is a node density of the network.

10. The node of claim 4, wherein the component is further configured to periodically update the at least one characteristic of the dynamic network based on information received from the one-hope neighbors of the node, and
    wherein, in reference to the predefined mapping, the processor is further configured to adjust the identified critical threshold based on an updated at least one characteristic of the dynamic network.

11. The node of claim 1, wherein the processor is further configured to receive a second packet from a one-hop neighbor of the node, the second packet identifying, within a portion of the second packet, a group of intended recipients of the second packet.

12. The node of claim 11, wherein the processor is further configured to determine whether the node is included within the group of intended recipients, and, in response to a determination that the node is included within the group of intended recipients, to forward the second packet to at least one one-hop neighbor based on the identified critical threshold.

13. The node of claim 1, wherein the at least one characteristic of the network determined by the component is a size of the network.

14. The node of claim 1, wherein the at least one characteristic of the network determined by the component is a node density of the network.

15. The node of claim 1, wherein the component is further configured to periodically update the at least one characteristic of the dynamic network based on information received from the one-hope neighbors of the node, and wherein, in reference to the predefined mapping, the processor is further configured to adjust the identified critical threshold based on an updated at least one characteristic of the dynamic network.

16. A method for transmitting packets between nodes of a dynamic network, the method comprising:
    receiving, by a component of a first node, information from at least one one-hop neighbor of the first node, the information indicative of at least one characteristic of the dynamic network;
    referencing a predefined table stored in the first node, the predefined table correlating network characteristics to related critical thresholds at which a delivery ratio of the first node is close to a maximum level and at which a total number of transmissions by the first node is close to a minimum number necessary to achieve the delivery ratio;
    identifying, in response to referencing the predefined table, one of the related critical thresholds in the predefined table associated with the first node; and
    transmitting, by the first node, a packet to at least one one-hop neighbor of the first node based on the identified critical threshold,
    wherein identifying one of the related critical thresholds includes identifying, in reference to the predefined table, a critical gossip probability of the first node.

17. The method of claim 16, wherein transmitting the packet to at least one one-hop neighbor of the first node includes transmitting the packet to a subset of the first nodes one-hop neighbors, the subset based on the critical gossip probability.

18. The method of claim 17, further comprising identifying, within a portion of the packet, the subset of the first nodes one-hop neighbors.

19. The method of claim 18, further comprising:
    receiving, by a second node, the transmitted packet from the first node;
    determining, by the second node, whether the second node is included in the subset of nodes identified in the received packet; and
    in response to a determination, by the second node, that the second node is included in the subset of nodes identified in the received packet, forwarding the packet to at least one one-hop neighbor of the second node.

20. The method of claim 19, wherein forwarding the packet to at least one one-hop neighbor of the second node comprises:
    referencing a predefined table stored in the second node, the predefined table correlating network characteristics of the second node to related critical thresholds of the second node at which a delivery ratio of the second node is close to a maximum level and at which a total number of transmissions by the node is close to a minimum number of transmissions necessary to achieve the delivery ratio of the second node;
    identifying, in response to referencing the predefined table of the second node, one of the related critical thresholds in the predefined table of the second node associated with the second node; and
    transmitting, by the second node, the packet to the at least one one-hop neighbor of the second node based on the identified critical threshold of the second node.

21. A method for transmitting packets between nodes of a dynamic network, the method comprising:
    receiving, by a component of a first node, information from at least one one-hop neighbor of the first node, the information indicative of at least one characteristic of the dynamic network;
    referencing a predefined table stored in the first node, the predefined table correlating network characteristics to related critical thresholds at which a delivery ratio of the first node is close to a maximum level and at which a total number of transmissions by the first node is close to a minimum number necessary to achieve the delivery ratio;
    identifying, in response to referencing the predefined table, one of the related critical thresholds in the predefined table associated with the first node; and
    transmitting, by the first node, a packet to at least one one-hop neighbor of the first node based on the identified critical threshold,
    wherein identifying one of the related critical thresholds includes identifying, in reference to the predefined table, a critical packet lifetime of the first node.

22. The method of claim 21, further comprising assigning the critical packet lifetime to the packet.

23. The method of claim 21, wherein receiving information indicative of at least one characteristic of the dynamic network includes receiving information indicative of at least one of a size of the dynamic network and a node density of the dynamic network.

24. The method of claim 21, further comprising generating the predefined table based on a plurality of network simulations including varying network characteristics.

25. The method of claim 16, wherein receiving information indicative of at least one characteristic of the dynamic network includes receiving information indicative of at least one of a size of the dynamic network and a node density of the dynamic network.

26. The method of claim 16, further comprising generating the predefined table based on a plurality of network simulations including varying network characteristics.

* * * * *